United States Patent
Favor

[11] 3,771,301
[45] Nov. 13, 1973

[54] HYDRAULICALLY ACTUATED DEVICE FOR SHAKING TREES

[75] Inventor: Robert R. Favor, Bowie, Tex.

[73] Assignee: Bowie Industries, Inc., Bowie, Tex.

[22] Filed: Jan. 4, 1972

[21] Appl. No.: 215,336

[52] U.S. Cl. ............................................ 56/328 TS
[51] Int. Cl. ............................................ A01g 19/00
[58] Field of Search ...................... 56/328 TS, 10.9, 56/11.9

[56] References Cited
UNITED STATES PATENTS

| 3,457,712 | 7/1969 | Gould et al. | 56/328 TS |
| 3,318,629 | 5/1967 | Brandt, Jr. | 56/328 TS |
| 3,594,999 | 7/1971 | Savage | 56/328 TS |
| 3,121,304 | 2/1964 | Herbst | 56/328 TS |

Primary Examiner—Russell R. Kinsey
Assistant Examiner—J. A. Oliff
Attorney—Wayland D. Keith et al.

[57] ABSTRACT

A vibrating device mounted on a movable frame, such as a tractor, so as to impart a vibrating motion to trees to dislodge fruit, nuts or seeds therefrom, which shaking may be of a low amplitude, to remove faulty or immature fruit, nuts or seeds, or to remove an excess of fruit, nuts or seeds from the tree, however, a later shaking action may be used to remove most or all of the fruit, nuts, seeds or the like in a harvesting operation. The present device is preferably mounted on a tractor having a powerlift hitch. A hydraulic pump is connected in driven relation with the mechanical power take-off of a tractor or the like, to furnish the power for a hydraulic pump to direct hydraulic fluid, under pressure, to the various elements of the tree clamping and shaking device. The tree clamping and shaking operations are performed by a single valve controlled by a lever, which lever, when moved in one direction, directs hydraulic fluid, under pressure, from a hydraulic pump to one end of a cylinder, to clamp a tree between the jaws of the tree shaking device, then a sequence valve is opened, by hydraulic pressure, to direct hydraulic fluid from the hydraulic pump, under pressure, to a hydraulic motor to drive eccentric weights to perform a shaking function on the tree clamped thereby. By movement of the valve control lever in the opposite direction, to a central position, the sequence valve closes and the hydraulic fluid will be diverted from the hydraulic motor, through a by-pass conduit, whereupon, the vibrations will cease, and, by further movement of the valve control lever in the same direction, hydraulic fluid will be directed into the opposite end of the hydraulic cylinder which actuated the clamping jaws to move the jaws apart and the hydraulic fluid therein will be directed from the opposite end of the cylinder to release the clamping jaws from the tree which is clamped therebetween.

4 Claims, 10 Drawing Figures

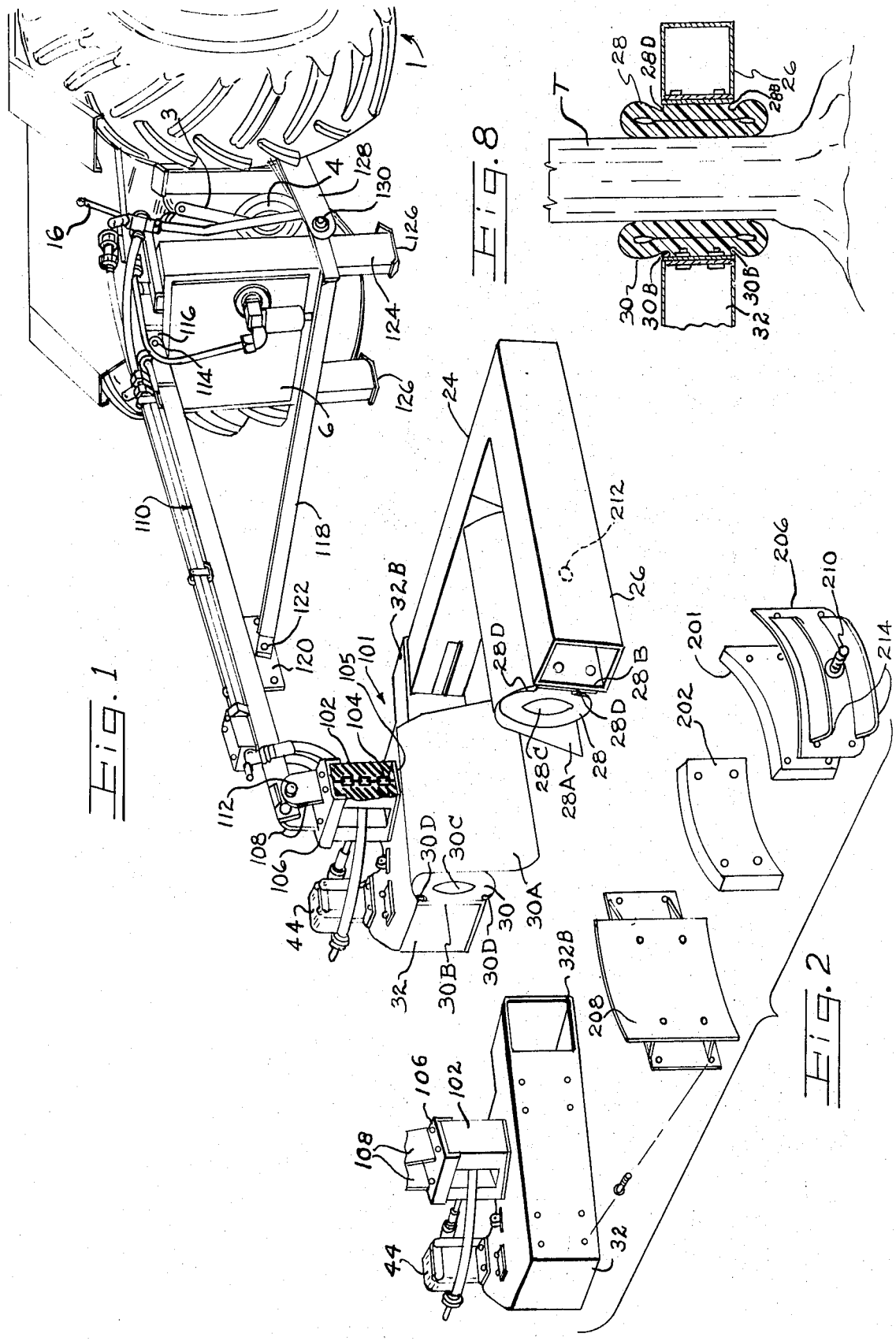

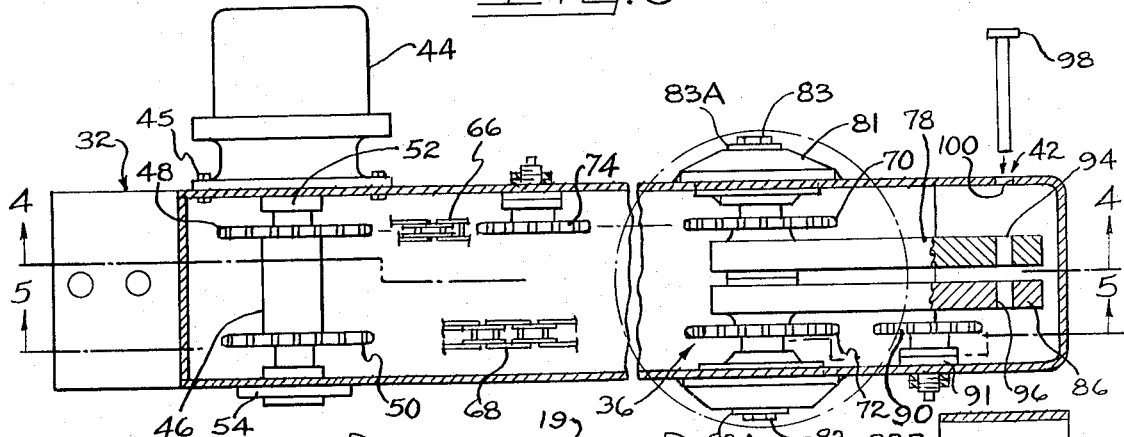
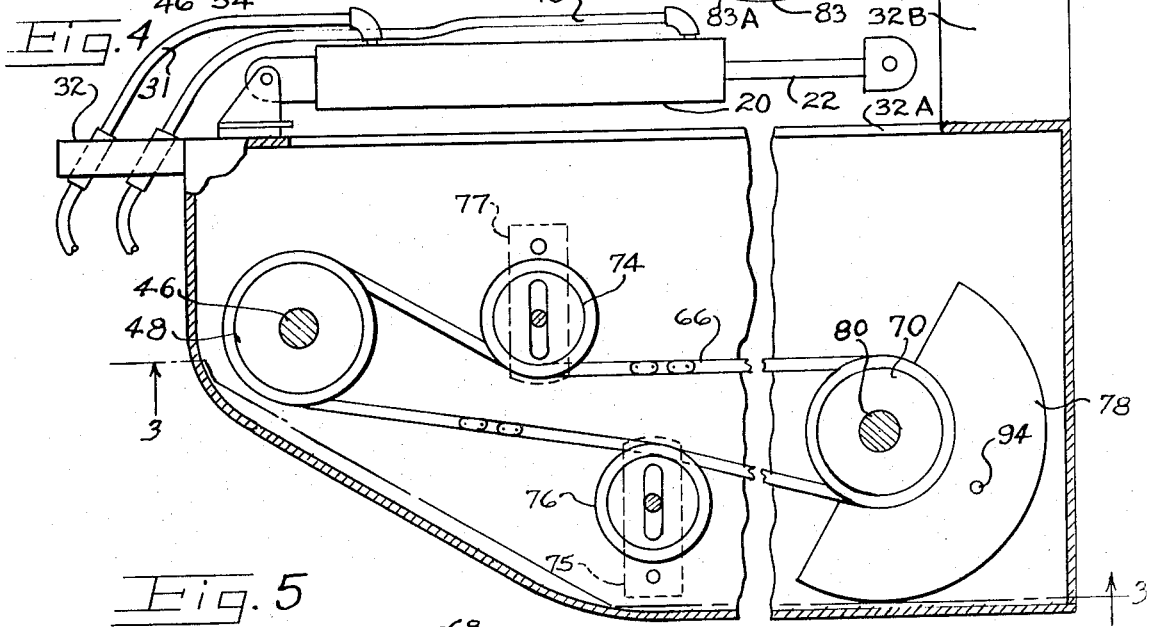
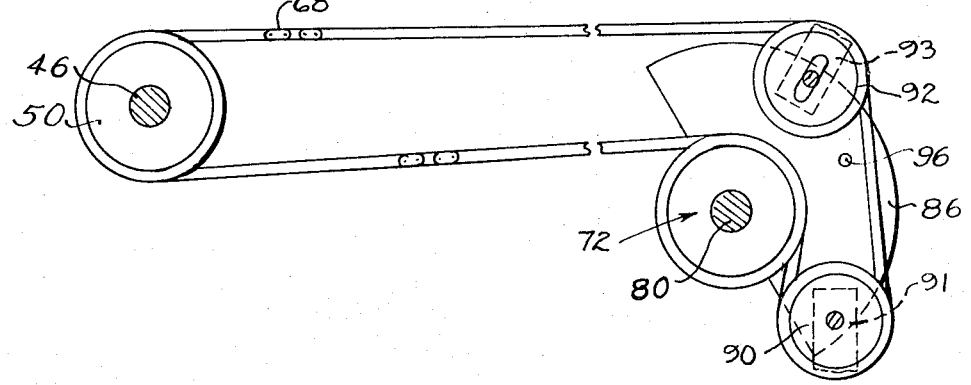

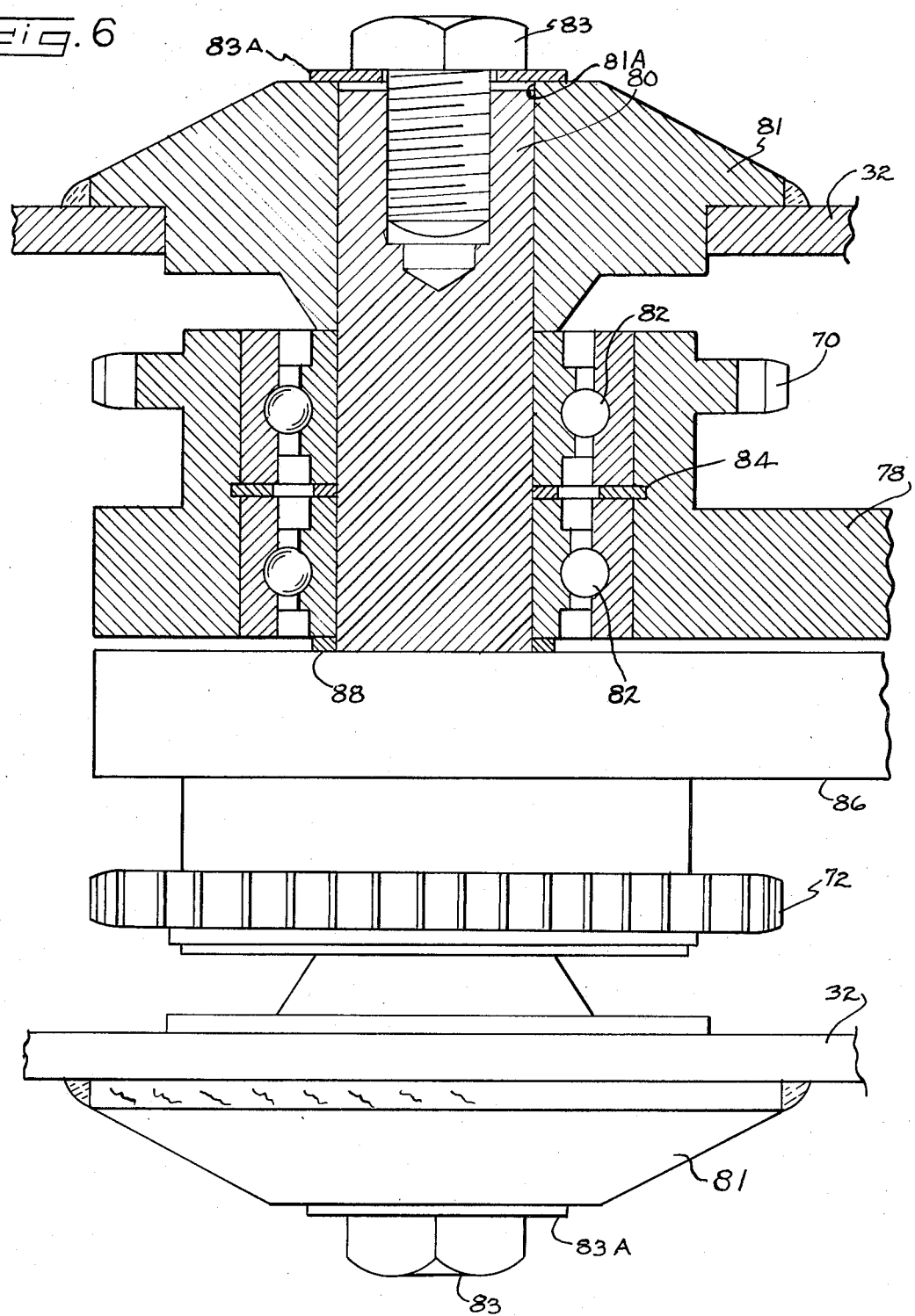

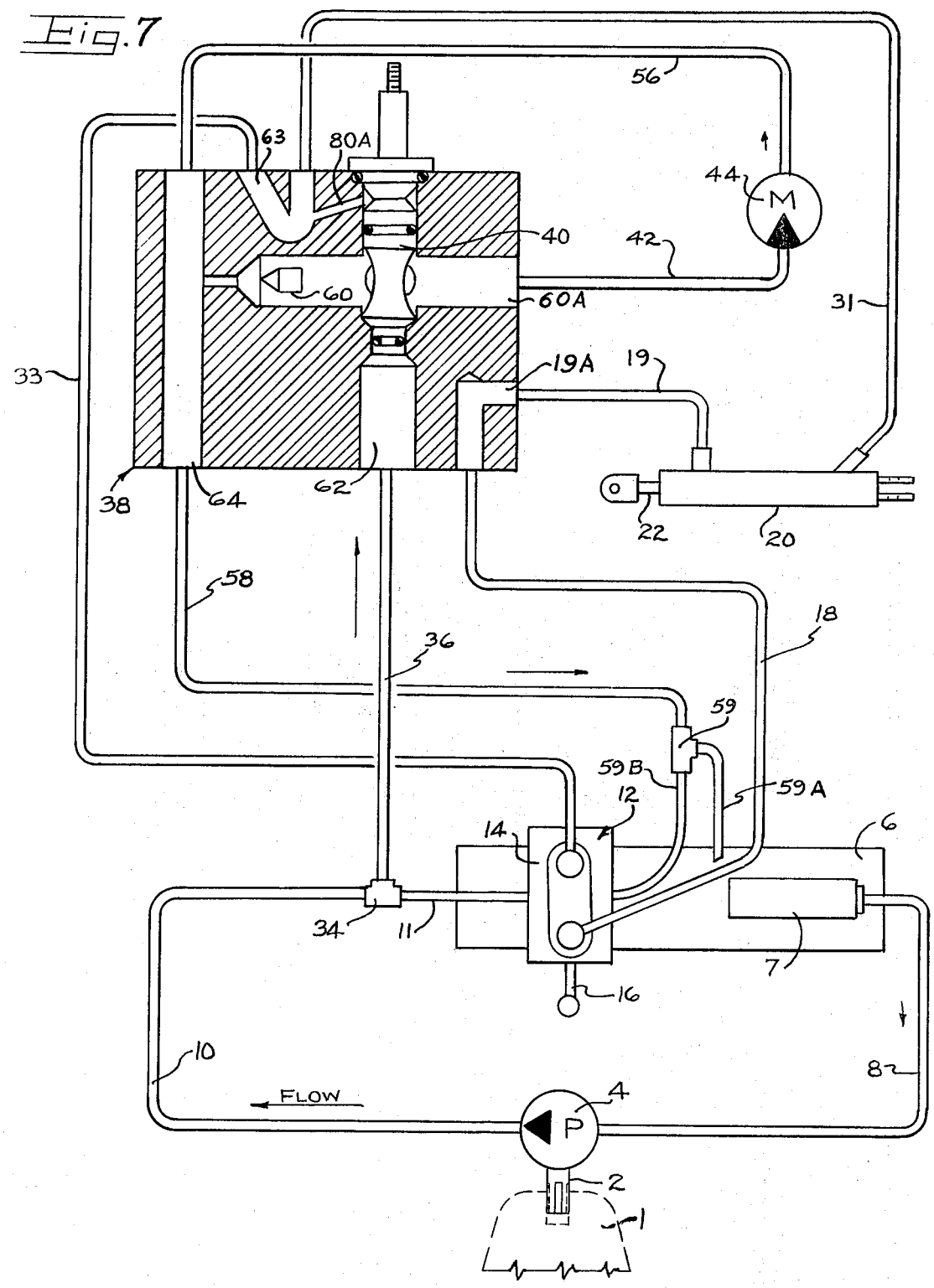

HYDRAULICALLY ACTUATED DEVICE FOR SHAKING TREES

BACKGROUND OF THE INVENTION

The present invention relates to improvements in tree shaking devices, and more particularly to a tree shaking device for harvesting fruit, nuts, and seeds which device utilizes a hydraulically actuated cylinder to perform a clamping action about a tree trunk. A hydraulically driven motor is used to rotate eccentric weights, after the tree shaking device is clamped to the tree, which eccentric weights of the tree shaking device create the vibratory motion that is transferred from the tree shaking device to a tree trunk or the like to perform a harvesting function.

Various types of vibratory tree shaking devices have been proposed heretofore but these, for the most part, were complex in structure and required several operations to connect the tree shaking device with the tree and to start the shaking procedure, each which operation required separate control mechanisms to perform such operations and time to perform it.

The present tree shaking device is hydraulically driven, and the device is clamped to the tree and the shaking operation is initiated by the manipulation of a single lever to control a control valve, which lever is so programmed that the tree is clamped between a pair of elastomer lined jaws by action of a hydraulic cylinder on the tree shaking device. Hydraulic fluid is then directed, by a sequence valve, to a hydraulic motor to drive eccentric weights of the tree shaking device. The hydraulic motor is started after the tree is clamped between the jaws of the clamping device by operation of the sequence valve which opens to direct hydraulic fluid under pressure to the motor which drives the eccentric weights in timed relation in opposite directions about a common axis. The rotation of the eccentric weights is so timed and adjusted as to get the maximum amplitude of vibration with a minimum input of power.

The present invention is so constructed, that by varying the volume of hydraulic fluid transmitted under pressure to the hydraulic motor, which drives the eccentric weights, vibrations are created, the intensity of which may be varied. The speed of the motor can be minutely controlled, to vary the speed of the eccentric weights which are driven thereby, so that a particular amplitude of vibrations can be imparted to the particular genus and size tree to be shaken, in such manner as to obtain the maximum recovery of fruit, nuts or seeds with the greatest efficiency.

The unique hydraulic circuitry of this machine requires only one four-way control valve to operate the mechanism of the machine to control all functions thereof, both the clamping function, to securely hold the machine to the tree, and the subsequent starting of the hydraulic motor to impart vibratory motion when the control lever is moved in one direction, and the imparting of the desired amplitude of vibration to the tree. The same four-way control valve, when the lever is moved in the opposite direction, closes off the flow of hydraulic fluid under pressure to the motor thereby stopping the motor and then, further movement of the valve lever in the same direction, which directs hydraulic fluid to the opposite end of the hydraulic cylinder to release the jaws which clamp the tree shaking device to the tree. The simplicity of this control arrangement enables an inexperienced operator to quickly master the controls and to operate the machine efficiently.

The invention is so constructed, that a minimal amount of vibration is transmitted to the tractor, thereby prolonging the life of the mechanism thereof, and to minimize the fatigue and physical discomfort of the operator, which fatigue and discomfort is inherent in many of the tree shaking devices that are in operation at the present. The present device is so constructed that it may be operated at very high speed to obtain high frequency vibrations, which is particularly desirable in harvesting certain fruits and nuts, and is preferable over the slower, longer stroke vibrations, which tend to injure a tree, but which systems are much in use at present. With high frequency, short stroke vibrations, there is less likelihood of injury to the tree.

SUMMARY

With the foregoing taken into consideration, an object of this invention is to provide a tree shaking device which may be moved from place to place and readily attached to the tree on which fruit, nuts or seeds are grown, which are to be shaken therefrom.

Another object of the invention is to provide a tree shaking device which may readily be mounted on a mobile apparatus, which tree shaking device is suspended from a boom mounted on a ground engaging element which ground engaging element and the tree shaking device may be raised or lowered, readily attached to the trunk of a tree, at the desired height, and operated without the operator having to leave the seat of the mobile apparatus.

Still another object of the invention is to provide a tree there shaking device, opposed of which are utilized to clamp a tree between, and to provide a motor to operate a vibrator to shake the tree, both of which operations are performed by the operation of a single lever to control a control valve.

A further object of the invention is to provide a tree shaking device that is mounted on the power lift of a tractor so that the boom thereof may be raised and lowered to enable the tree shaking device to engage a tree at the desired height.

Still a further object of the invention is to provide a tree shaking device that is hydraulically driven from a source of fluid pressure generated by the mobile unit on which the tree shaking device is mounted.

Yet another object of the invention is to provide a tree shaking device that engages the tree transversely with respect to the longitudinal axis of the mobile apparatus or the tractor so that the vibratory movement of the tree shaking device will be transmitted transversely with respect to the boom of the mobile apparatus to minimize transfer of vibrations transmitted to the mobile apparatus and to the operator.

Still another object of the invention is to provide a ground engaging support intermediate the tractor and the tree shaking device to support the boom of the tree shaking device, which support is brought into engagement with the ground by the power lift hitch of the mobile apparatus.

Still a further object of the invention is to provide hydraulically actuated clamping jaws, which clamping jaws have elastomer faced liners thereon to enable the trunk of the tree to be gripped therebetween without damage to the tree.

And a final object also is to provide a tractor mounted tree shaking device that is easy to install on a tractor and to remove therefrom, easy to operate, which device is relatively low in the cost of construction, efficient in operation, and low in the cost of maintenance and operation.

BRIEF DESCRIPTIONS OF THE DRAWINGS

With the above objects in mind and others which will become evident as the descriptions proceeds, reference will be had to the accompanying drawings in which:

FIG. 1 is a perspective view of the rear portion of a mobile apparatus such as a tractor having the tree shaking device installed thereon, showing the ground engaging support mounted on the power lift hitch of a tractor and showing an hydraulic system associated therewith with a movable boom which is hingedly connected to the tank of the hydraulic system and extends rearward therefrom, which boom has the tree shaking device suspended therefrom;

FIG. 2 is an exploded view of the elastomer tree trunk engaging elements and the mounting therefor;

FIG. 3 is a sectional view taken approximately on line 3—3 of FIG. 4, looking in the direction indicated by the arrows;

FIG. 4 is a sectional view taken on line 4—4 of FIG. 3, looking into the direction indicated by the arrows;

FIG. 5 is a sectional view taken on line 5—5 of FIG. 3, looking into the direction indicated by the arrows;

FIG. 6 is an enlarged, elevational, fragmentary view of the eccentric shaft and the mountings therefor, with parts being broken away and with portions shown in section to bring out the details of construction;

FIG. 7 is a diagrammatic view of the hydraulic system, showing the hydraulic pump mechanically connected in driving relation with a mobile apparatus, such as a tractor;

FIG. 8 is an elevational view showing the clamp portion of the tree shaking device engaging a tree, and showing the elastomer pads in compressed condition;

Figure 9:
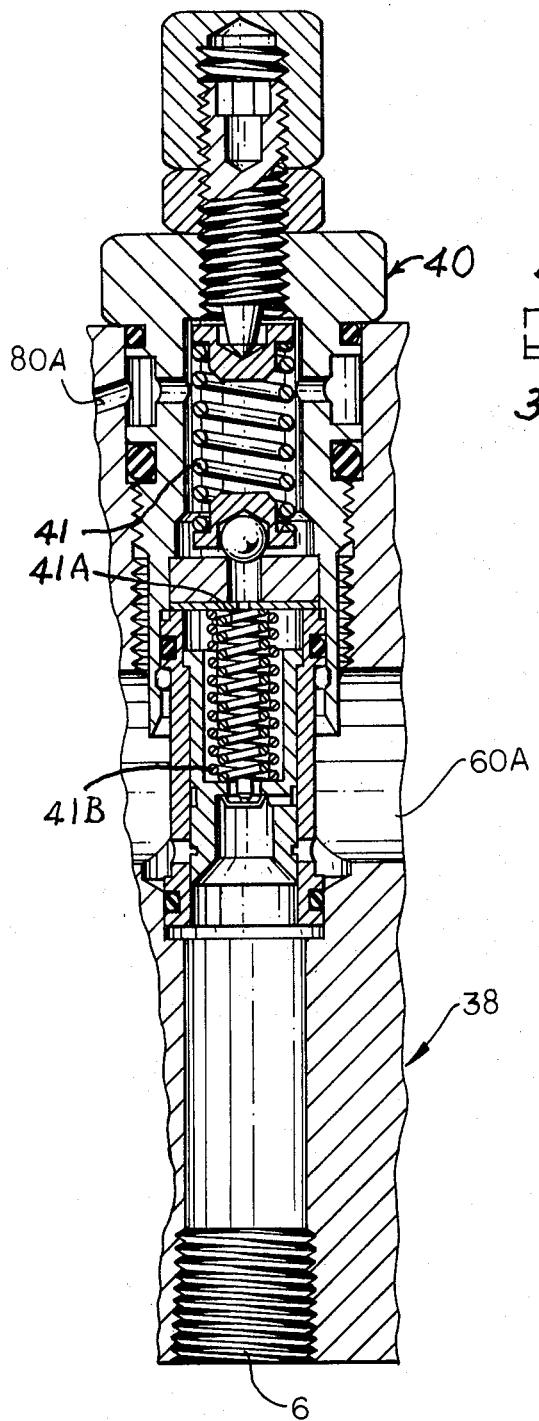
Figure 10:
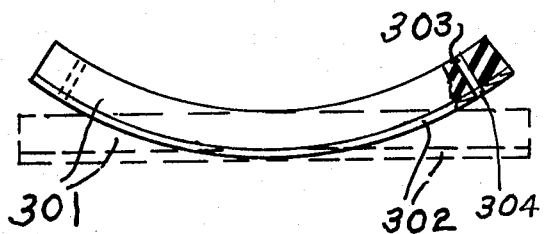

FIG. 9 is an enlarged, longitudinal sectional view of a conventional hydraulically actuated, spring pressure closed sequence valve shown in place in a fragmentary portion of a mounting block, with parts being broken away and with parts being shown in elevation to bring out the details of construction; and FIG. 10 is an elevational view of a curved metallic plate with a curved elastomer pad bonded thereto, which curving of the pad and straight metallic plate, as shown in full outline, is performed subsequent to the bonding, as shown in dashed outline, of the elastomer pad to the metallic plate.

DETAILED DESCRIPTION OF THE PREFERRED EMBODIMENT

With more detailed reference to the drawings, particularly FIG. 7, the numeral 1 designates generally a mobile apparatus, such as a tractor, which has a power take-off shaft 2, which shaft is connected in driving relation with a fluid pump 4 so as to furnish a continuous flow of fluid from the hydraulic reservoir 6, filter 7 and through the suction conduit 8, thence through the pump 4 to be discharged, under pressure, through conduit 10 to the four-way valve assembly, designated generally by the numeral 12.

The valving mechanism 12 includes a four-way valve 14 having a control lever 16 mounted thereon, which control lever is operable in a straight line, so when moved in one direction, hydraulic fluid will be directed from the valve 14 into conduit 18 into the end of the hydraulic cylinder 20 adjacent the piston rod 22 thereof, which will cause the piston rod 22 to retract to move the beam or clamp arm 24 longitudinally, which will cause the jaw 26, which carries the resilient tree engaging pad 28, to be brought into engagement with the trunk of a tree, so as to clamp the tree between resilient pads 28 and 30.

Upon the hydraulic fluid entering the piston rod end of cylinder 20, hydraulic fluid is exhausted from the opposite end of the cylinder 20 into conduit 31 leading to and through manifold block assembly 38 to conduit 33 which leads to and through four-way valve 12 to exhaust into reservoir 6. The conduits 31 and 33 are in communication with sequence valve 40, which valve is responsive to hydraulic pressure in conduits 33 and 31.

The pad 30 is mounted on the housing 32 of the tree shaking device.

The form of the invention shown in FIG. 1, shows hollow, resilient pads 28 and 30, which pads are compressible to avoid injuring the tree being shaken. With the trunk of the tree clamped in this manner, and with additional pressure being exerted on conduit 10, hydraulic fluid, under pressure, will be directed to and through tee 34 into conduit 36, thence into passage 62 in the manifold block assembly 38 to actuate sequence valve 40 which is positioned therein, into passage 60A, which passage connects with conduit 42, as will best be seen in FIG. 7. This will direct hydraulic fluid, under pressure, into and through conduit 42 to a fluid motor 44, which motor 44 is mounted on the tree shaker housing 32, thereby the hydraulic fluid, under pressure, will cause the fluid motor to rotate drive shaft 46 on which sprockets 48 and 50 are mounted, as will best be seen in FIG. 3. One end of the shaft 46 is journaled in a bearing 52 in the hydraulic motor 44, and the opposite end thereof is journaled in a bearing 54 on the housing 32, in a manner well understood in the art of bearings.

With the trunk of the tree as shown in FIG. 8, clamped between the resilient pads 28 and 30, and with the pressure being increased to move the sequence valve 40 into a position to direct hydraulic fluid from conduit 36 through manifold block assembly 38 into the conduit 42, the hydraulic fluid will flow into and through motor 44, as indicated by the arrow in FIG. 7, and will be exhausted into conduit 56, thence through passage 64 in manifold block assembly 38 and through return line 58, through tee 59 into conduit 59A, into reservoir 6, or through conduit 59B into valve 14. Anticavitation check valve 60 is provided within the manifold block assembly 38, between passages 62 and 64 therein, to prevent the flow of fluid from conduit 42 into passage 64.

In this manner the tree trunk will remain clamped between resilient pads 28 and 30, and the motor will not start until the desired clamping action is had on the tree trunk, after which, the sequence valve 40 will be actuated to cause fluid, under pressure, to be directed into and through the fluid motor 44, which will cause the motor 44 to start. The motor 44 will drive sprockets 48 and 50, which sprockets drive the respective chains 66 and 68. The chain 66 is connected in direct driving relation with sprockets 48 and 70, which sprockets 48 and 70 will rotate in the same direction. Idler sprockets 74 and 76 are mounted on adjustable brackets 75 and 77, one on each side of chain 66, so as to compensate for wear on the chain and sprockets, and also to adjust the timing of eccentric 78 with respect to eccentric 86, which sprocket-eccentric assemblies are journaled on shaft 80. The sprocket 70 is connected with the eccentric 78 and is journaled on bearings 82 which are held in fixed relation within the sprocket-eccentric assembly by means of a snap ring 84, so that the sprocket-eccentric assembly 70-78 will rotate freely on the shaft 80.

A sprocket 72, which is similar to sprocket 70, is secured integral with eccentric 86 and is journaled on bearings (not shown) similar to those shown at 82, FIG. 6, which eccentrics 78 and 86 are spaced apart by means of a spacing ring 88, as will best be seen in FIG. 6.

The housing 32 has the fluid driven motor 44 mounted thereon and secured thereto, as by bolts 45, so the shaft 46 will be perpendicular to the face of the housing 32, near one end thereof. The eccentric shaft 80, which, in the present instance is a dead shaft, is mounted within the housing parallel to shaft 46, near the opposite end of the housing 32, within apertured bosses 81. The apertures in the bosses 81 are bored so they will be axially aligned.

Sprocket-eccentric assembly 70 and 78 and sprocket-eccentric assembly 72 and 86 are mounted on shaft 80, which shaft may be inserted within the apertures or bores 81A of the bosses 81. The shaft 80 is held against longitudinal movement by cap screws 83 and washers 83A, with one of the cap screws threadably engaging each end thereof, as is best seen in FIG. 6. The removal of the cap screws 83 and the washers 83A thereunder enables the removal of the shaft 80, thereby enabling the sprocket-eccentric assemblies, including the bearings, to be removed through an opening 32A in the side of housing 32, which opening 32A is covered by beam or clamp arm 24.

The housing 32 has a loop 32B thereon, near an end thereof on the side of the housing adjacent the opening 32A, which loop receives the beam or clamp arm 24 in complementary sliding relation, which beam or clamp arm 24 may be removed from loop 32B upon disconnection of the hydraulic cylinder 20 from the housing 32. This will enable the beam, covering the opening 32A, to be removed, thereby to give access to the interior of the housing 32 to enable assembly, repair, and/or replacement of any or all parts therein.

The beam or clamp arm 24 is hollow and has one end of the plunger 22 of hydraulic cylinder 20 pivotally connected thereto, the other end of the hydraulic cylinder 20 is pivotally connected to the housing 32 to enable the beam or clamp arm 24 to be moved longitudinally to enable the jaw 26 to grip or release the trunk of a tree, upon application of hydraulic pressure to one end or the other of the hydraulic cylinder 20.

The sprocket 72 is driven in the opposite direction to that of sprocket 70, in that chain 68 passes over idler sprockets 90 and 92, which are mounted on supports 91 and 93, respectively, so the sprocket 72 will be driven from the opposite side of the chain, as shown in FIGS. 3 and 5, to perform a reversing action of sprocket-eccentric assembly 72 and 86 with respect to sprocket-eccentric assembly 70 and 78. The idler sprocket 92, as well as idler sprockets 74 and 76, are mounted on adjustable supports 75 and 77, respectively, to enable the timing of the eccentrics by at least one link of the chain. Timing holes 94 and 96 are provided in the respective eccentrics 78 and 86, which holes 94 and 96 are brought into axial alignment to provide proper timing of the eccentrics, as will best be seen in FIGS. 3, 4 and 5. A timing setting pin 98 may be inserted throgh hole 100 in housing 32 so as to register with aligned holes 94 and 96, in the respective eccentrics 78 and 86, to assure proper timed relation between the eccentrics to give the proper synchronization of the eccentrics to obtain the proper direction of vibration of the device.

The vibrating and clamping unit, of the tree shaking device is designated generally by the numeral 101, in the preferred mounting thereof, has a pair of upstanding, elastomer blocks 102 on the upper side thereof, in which elastomer blocks 102 support chains 104 are embedded, which chains are connected to the respective mounting plates 105 and 106. The plate 105 is secured to the upper face of housing 32, and the transverse support member 106 is secured to boom 110. The elastomer blocks 102 are also bonded to the upper face of mounting plate 105 and to the lower face of transverse member 106, respectively. The transverse support member 106 is mounted on the upper side of the elastomer blocks 102. The transverse support member 106 has a pair of upstanding, apertured lugs 108 thereon to pivotally receive a pivot pin 112 therethrough and the outer end of the apertured boom assembly, designated generally by the numeral 110. The pivot pin 112 couples the vibrating and clamping unit 101 to the boom 110, which vibrating unit 101 extends transversely of the boom 110. The boom 110 is pivotally mounted on pivot pin 114, which pin passes through the aperture of the boom and through the apertured ears 116 on the upper side of the reservoir 6.

An apertured brace 118 extends from the lower portion of the reservoir 6 upwardly at an angle and connects to an aper-tured lug 120 on boom 110 by connector pin 122. The apertured lug 120 has several apertures formed therein, so the angularity of the boom 110 may be varied with respect to the upright support legs 124 on reservoir 6. The upright support legs 124 each has a foot 126 on the lower end thereof to enable the unit to be quickly disconnected from a power lift hitch 128 of the tractor 1, with the feet of the upright legs 124 supporting the legs in position to enable ready reconnection with the tractor 1. Power lift hitches are well known in the art of tractors, and when the support legs 124, on which the reservoir 6 is mounted, are lowered against the ground, the feet 126 will seat on the ground to readily enable the hitch bar of the tractor to be connected thereto by pins or bolts 130.

When it is desired to attach the vibrating unit 101 to a tree T, the power lift 128 is used to elevate the reservoir 6, legs 124, boom 110, the vibrating unit 101 and clamping device 24 to the proper height to enable the elastomer pads 28 and 30 to engage the tree trunk.

Since the clamping unit 24 and vibrating device 101 are positioned transversely of the tractor 1, and transversely with respect to the boom 110, a minimum of vibration is transmitted to the tractor 1 and to the operator thereof, as compared to the type of shaker which is connected to a tractor with the boom so the vibrations are transmitted longitudinally of the boom to the tractor.

OPERATION

With the tree shaking device 101 connected to the power lift hitch 128 of the tractor 1, as by pins 130, and with the pump 4 connected in driven relation with the power take-off of the tractor, and with the pump 4 connected in operative relation with the tractor 1 by engagement of lever 3, hydraulic fluid is withdrawn from reservoir 6, through filter 7, through conduit 8 by pump 4, which hydraulic fluid is discharged through conduit 10 into tee 34, with one branch conduit 11 thereof leading fo a four-way valve assembly 12, which, when the lever 16 is moved to the operating position, will direct hydraulic fluid into conduit 18, to manifold block assembly 38, thence through conduit 19 into the piston rod end of cylinder 20. Simultaneously, the fluid that is in the opposite end of the hydraulic cylinder 20 will be discharged into conduit 31 which leads through passage 64 in the manifold block assembly 38 to conduit 33 and through four-way valve 12, which valve connects with conduit 59B, tee 59 and conduit 59A, which discharges into reservoir 6; pressure is simultaneously directed into conduit 36 to sequence valve 40, which valve is closed by spring pressure, until hydraulic fluid, directed into cylinder 20, brings elastomer members 28 and 30, which members are mounted on jaw 26 of the housing 32, into desired binding engagement with the trunk of the tree which is to be clamped therebetween.

The sequence valve, designated generally at 40, is representative of the hydraulically actuated, spring pressure closing sequence valve. This valve is representative of a hydraulically actuated, spring pressure closed sequence valve such as may be obtained from Fluid Controls, Inc. Mentor, Ohio, which company has distributors throughout the United States and in many industrial foreign countries, however, various other sequence valves are manufactured and sold which will perform the same function, therefore, the inventor makes no claim to the sequence valve per se, except as it performs the function of any sequence valve, in the present invention. The sequence valve used is designated by a Company part No. 1 SA 10 and is particularly illustrated in the Fluid Controls, Inc. catalog, revised 6/71 on pages 3.3 and 3.4. The sequence valve 40 has springs 41, 41A and 41B to actuate the valve, as particularly brought out in FIG. 9.

After the tree trunk is securely clamped between the members 28 and 30, additional hydraulic pressure is applied to sequence valve 40, which will cause the sequence valve to direct hydraulic fluid into conduit 42 which leads to the fluid motor 44, this hydraulic fluid pressure causes the motor to rotate at a speed in accordance with the amount of fluid directed therethrough. The hydraulic fluid from motor 44 exhausts into conduit 56, thence through passage 64 in manifold block assembly 38 into conduit 58 and through tee 59 into branch conduit 59A into the reservoir 6.

As the hydraulic fluid, under pressure, is directed from the sequence valve 40 into conduit 42, the motor 44 is rotated to drive the eccentrics 78 and 86 at the desired speed, with the eccentrics being driven in opposite directions to produce a movement laterally with respect to the boom 110 to create vibrations, with the resilient blocks 102 absorbing a substantial amount of the vibrations before these vibrations are received by the boom. With the vibrating and clamping device 101 mounted laterally with respect to the boom, minimum vibration is received by the tractor and by the operator thereof.

When it is desired to cease shaking the trunk of the tree, the lever 16 is released and will move to the neutral position, thus allowing fluid to return through valve assembly 12 and tee 59, and branch conduit 59A to reservoir 6.

Upon movement of the lever 16 in the opposite direction from the aforementioned position, which is the operating position, hydraulic fluid will be directed from four-way valve assembly 12 into conduit 33, into and through passage 63 in manifold block assembly 38 into conduit 31, into the end of hydraulic cylinder 20 opposite piston rod 22 thereof, which will cause the piston rod 22 to move jaw 26 and elastomer pad 28 away from the tree trunk, with the hydraulic fluid being discharged from the piston rod end of the hydraulic cylinder 20 into conduit 19 into and through passage 19A in manifold block assembly 38, thence through conduit 18 into four-way valve 12 and out through conduit 59B, tee 59 and conduit 59A into reservoir 6; whereupon, the jaw 26 is opened to enable the device to be moved to another tree to be shaken. Sheets of plastic or fabric 28A and 30A may be attached to the respective elastomer pads 28 and 30 to protect the face of the pad and also to protect the bark of some species of trees. A drain passage 80A interconnects with the passage 63, in block 38, and with the cavity of the sequence valve 40 which allows varying amounts of the total flow of hydraulic fluid to be by-passed by the motor and back to the reservoir. By adjusting the sequence valve 40, the flow rate through the passage 80A can be varied from zero gallons per minute to the total gallons per minute output of the pump.

The elastomer pads 28 and 30 are elongated and are mounted on jaw 26 and housing 32 respectively, as will best be seen in FIGS. 1 and 8. The inner face of each of the pads 28 and 30 is flattened and is bonded to the respective plates 28B and 30B. The pads are hollow and each pad has an elliptical hole 28C and 30C, respectively passing therethrough, with the major axis of the respective ellipses of the holes being substantially vertical. Grooves 28D are formed on each side of elastomer pad 28 and grooves 30D are formed on each side of elastomer pad 30 intermediate the respective pads and the respective plates, so as to form a flexing point.

The respective pads 28 and 30 are substantially elliptical in end elevation with approximately uniform thickness of elastomer material surrounding the respective elliptical holes 28C and 30C therein, which permits ready yielding of the elastomer material within the pad, with a minimum of strain thereon.

It is preferable to have the elastomer pads 28 and 30 detachably secured to the jaw 26 and to the housing 32 respectively by means of bolts, so as to enable these elements to be removed and replaced as necessary.

MODIFIED FORM OF CLAMPING PAD

A modified form of clamping pad is shown in exploded view, FIG. 2, which form of clamping pad is interchangeable with pads 28 and 30. The pads 201 and 202 are secured, as by bolting or other means, to the mounting members 206 and 208 respectively, which pads are preferably more dense and are made of elastomer material, such as polyurethane, so as to transfer more intense shock vibrations to larger trees being shaken, especially to trees, the bark of which is not readily damaged. The pad 202 is bolted to mounting member 208 which is secured to the housing 32, as by bolts, cap screws or the like. The mounting member 208 has an apertured plate thereon, which plate may be secured to the housing 32 as by bolts, cap screws or the like. The mounting member 206 has a threaded bolt 210, which bolt extends in the direction opposite to the elastomer pad 202 and passes through an aperture in the inner face of jaw 26.

A pair of ribs 214, one of which is positioned on each side of bolt 210 on mounting member 206, enables a rocking motion to be imparted to member 206 so that the elastomer members 201 and 202 will readily conform to the tree trunk. This enables the proper alignment of the shaking device with the trunk of the tree.

Further Modified Form of Clamp Pad

A further modified form of clamping pad, FIG. 10, shows an elastomer pad 301 which is bonded, as by vulcanizing or bonding, to a metallic plate 302, while the plate and pad are in the position shown in dashed outline in FIG. 10, then the plate 302 and elastomer pad 301 are pressed into a curve or otherwise curved, as indicated in full outline in FIG. 10. Holes 303 and 304 are formed in the elastomer pad and plate to enable the pad to be bolted onto plates 208 and 206, respectively.

By vulcanizing or bonding the elastomer pad 301 onto plate 302 prior to the curving thereof, the elastomer material is put in compression at the point of bonding and resists being torn from the metal plate to a much greater degree than if the elastomer pads were bonded to concave plates after the plates had been curved. These pads are interchangeable with pads 28, 201 and 202, as shown in FIGS. 1, 2 and 8.

What is claimed is:

1. A hydraulically actuated tree clamping and tree shaking device mounted on a mobile unit, which device comprises;
   a. a boom secured to and extending outwardly from the mobile unit,
   b. a housing supported by said boom near the outer end thereof transversely with respect thereto,
      1. elastomer support means intermediate said boom and said housing,
      2. a pair of eccentric members journaled within said housing for rotation thereof about a common axis to impart vibratory motion to said housing transversely of said boom,
   c. a hydraulic motor mounted on said housing and having drive means thereof extending into said housing,
   d. endless transmission means connected with said drive means on said hydraulic motor and with said eccentric members to drive said eccentric members in opposite directions to create the vibratory motion transversely of the boom and of the mobile unit,
   e. an arm slidably secured to said housing,
      1. said arm having an inturned jaw thereon near the outer end thereof,
      2. an elastomer pad mounted on an inner face of said housing,
      3. an elastomer pad mounted on said inturned jaw in opposed relation to the elastomer pad mounted on said inner face of said housing,
   f. a hydraulic cylinder-plunger assembly interconnecting said housing and said arm to move said arm relative to said housing,
   g. a hydraulic reservoir detachably connected to the mobile unit,
   h. a hydraulic pump detachably connected in operative relation with the mobile unit,
   i. a single lever, manually actuated hydraulic control valve,
      1. a discharge conduit connected with said hydraulic pump and with said hydraulic control valve,
   j. a hydraulically actuated spring pressure closing sequence valve,
      1. a branch conduit of said discharge conduit connected in fluid communication with said sequence valve,
      2. a conduit leading from said sequence valve to said hydraulic motor,
   k. conduits interconnecting opposite ends of said hydraulic cylinder-plunger assembly with said hydraulic control valve,
      1. movement of said manually actuated single lever on said hydraulic control valve, in one direction, causing said manually actuated hydraulic control valve to direct hydraulic fluid under pressure to one end of the hydraulic cylinder of said cylinder-plunger assembly to move said arm, carrying said inturned jaw, toward said housing to clamp a tree trunk between said elastomer pads,
      1. said sequence valve opening when a predetermined fluid pressure is exerted thereon to clamp the tree trunk between said elastomer pads for diverting hydraulic fluid under pressure through said conduit leading therefrom to said hydraulic motor,
      1. a discharge conduit leading from said hydraulic motor to said hydraulic reservoir to discharge hydraulic fluid from said motor thereinto, and
      2. movement of said manually actuated lever in a direction opposite to said one direction decreasing pressure on said sequence valve to stop the flow of hydraulic fluid to said motor, and upon further movement of the lever, directing hydraulic fluid under pressure to the opposite end of the hydraulic cylinder to cause relative movement between the cylinder and plunger of the cylinder-plunger assembly and said inturned jaw on said arm to release the elastomer pads from engagement with the tree trunk and to direct the fluid from the opposite end of the hydraulic cylinder into said conduit leading to said reservoir.

2. A hydraulically actuated tree clamping and tree shaking device as defined in claim 1; wherein
   a. said elastomer pads are each mounted on a metallic plate and bonded thereto,
   b. said plates are curved inward after the bonding of the elastomer thereto so as to exert compression on the elastomer.

3. A hydraulically actuated tree clamping and tree shaking device as defined in claim 9; wherein
   a. said hydraulic pump is detachably connected to said mobile unit to enable the removal of the entire shaking device without disconnecting said hydraulic conduits.

4. A hydraulic tree clamping and tree shaking device, mounted on a mobile unit, which device comprises;
   a. a boom secured to and extending outward from the mobile unit, b. a housing supported by said boom near the outer end thereof,
  1. a pair of eccentric members journaled within said housing for rotation in opposite directions,
  2. drive means connected to each said eccentric member,
c. a hydraulic motor mounted on said housing,
  1. drive means connected to said hydraulic motor,
d. endless transmission means connected with the drive means on said hydraulic motor and with the drive means on each said eccentric member to drive said eccentric members in opposite directions to create a vibratory motion,
e. a movable arm on said housing, which arm has an inturned jaw thereon to engage a face of said housing in abutting relation,
f. a hydrauilc cylinder-plunger assembly interconnecting said arm and said housing to impart relative movement therebetween,
g. a power driven hydraulic pump,
h. a hydraulic reservoir,
  1. a conduit connecting said hydraulic pump in fluid communication with said reservoir,
i. a single lever, manually actuated hydraulic control valve,
  1. a discharge conduit connected to said hydraulic pump and to said manually actuated control valve,
j. a hydraulically actuated, spring pressure closing sequence valve,
  1. a branch of said discharge conduit connected in fluid communication with said sequence valve,
  2. a conduit leading from said sequence valve to said hydraulic motor,
k. conduits interconnecting opposite ends of said hydraulic cylinder-plunger assembly with said manually actuated hydraulic control valve,
  1. movement of said manually actuated single lever on said hydraulic control valve in one direction causing said manually actuated hydraulic control valve to drect hydraulic fluid under pressure to one end of the hydraulic cylinder of said cylinder-plunger assembly to move said arm with said inturned jaw thereon toward said housing to clamp a tree trunk therebetween,
l. said sequence valve opening when a predetermined fluid pressure is exerted thereon to clamp a tree trunk between said inturned jaw on said arm and said housing for diverting hydraulic fluid under pressure through said conduit leading therefrom to said hydraulic motor,
  1. a discharge conduit leading from said hydraulic motor to said hydraulic reservoir to discharge hydraulic fluid from said motor thereinto while said motor is operating,
  2. movement of said manually actuated lever in a direction opposite to said one direction decreasing pressure on said sequence valve to stop the flow of hydraulic fluid to said motor and upon further movement of said lever, directing hydraulic fluid under pressure to the opposite end of said hydraulic cylinder to cause relative movement between the cylinder and the plunger of the cylinder-plunger assembly and said inturned jaw on said arm to release the tree trunk from between the inturned jaw and said housing and to direct fluid from the opposite end of the hydraulic cylinder into the conduit leading to said reservoir.

* * * * *